June 1, 1926.
H. W. SPENCE
MICROTOME
Filed July 20, 1925
1,587,248
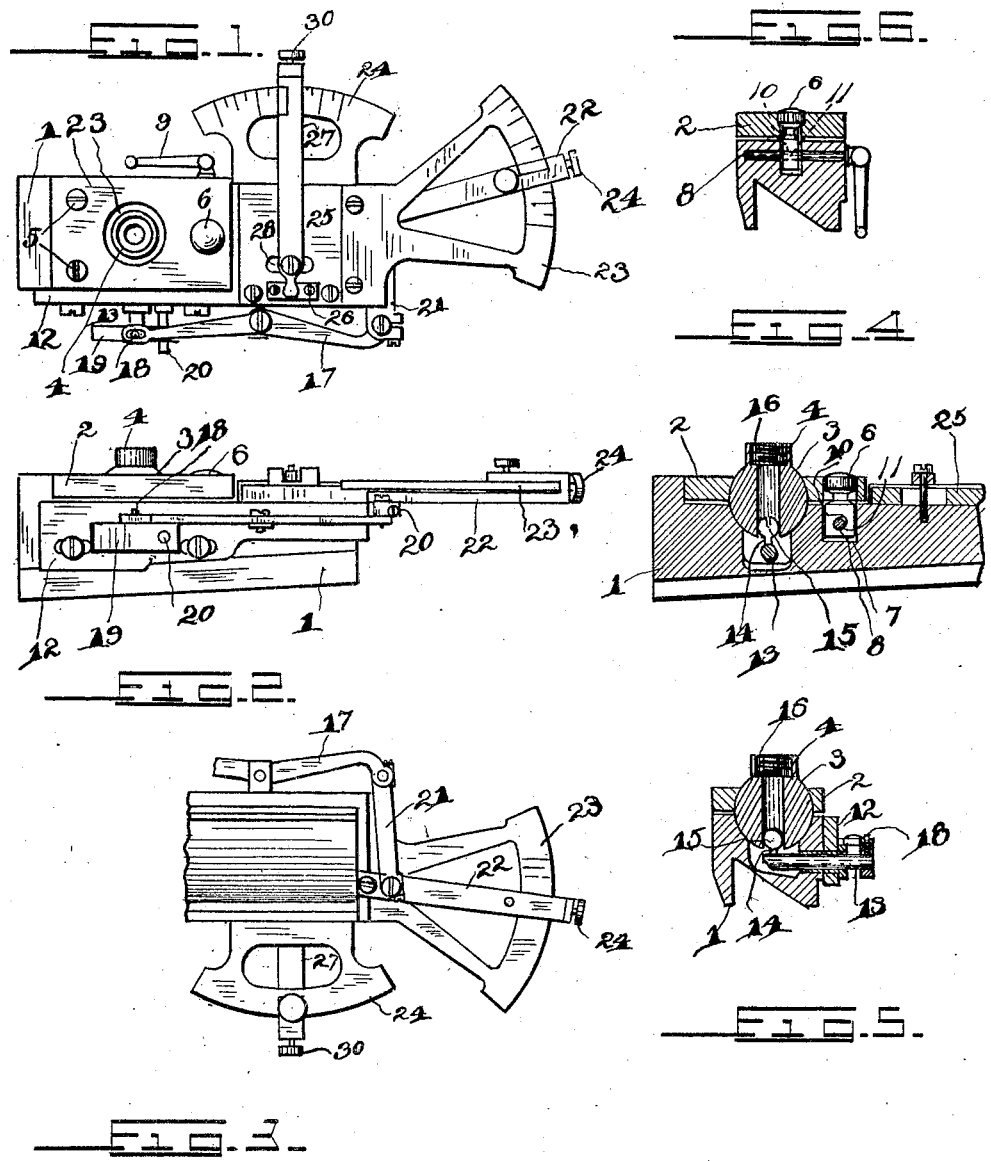
INVENTOR
H. W. Spence
BY J. Edward Maybee
ATTY Patented June 1, 1926.

1,587,248

UNITED STATES PATENT OFFICE.

HERBERT W. SPENCE, OF TORONTO, ONTARIO, CANADA.

MICROTOME.

Application filed July 20, 1925. Serial No. 44,853.

This invention relates to apparatus such as used to hold an article while a cut is made through the same for the purpose of making microscopic observations of the section, and the object of the present invention is to devise special means for controlling the movement of the work holder whereby a very fine horizontal adjustment in two directions at right angles to each other of its position relative to the tool may be obtained, and whereby such fine adjustment may be obtained without sacrificing rigidity or strength in the apparatus.

I attain my object by means of the constructions hereinafter described and illustrated in the accompanying drawings in which—

Fig. 1 is a plan view of my apparatus;
Fig. 2 a side elevation of the same;
Fig. 3 a plan view of part of the under side;
Fig. 4 a longitudinal section through part of the apparatus;
Fig. 5 a cross section through the same;
Fig. 6 a sectional detail through the locking means.

In the drawings like numerals of reference indicate corresponding parts in the different figures.

The drawings and descriptive part of the specification are confined to the structure of that part of a microtome which carries the adjustable work holder, and as the means for holding and moving the knife, and for elevating and lowering the work holder form no part of my invention, the illustration and description of those portions of a microtome have been purposely omitted.

A base of suitable form to carry the work holder is provided, and comprises a main portion 1 and a removable portion 2. The base will usually be slidably mounted on an inclined guide, not shown, whereby by moving the base lengthwise of the guide, the height of the base may be varied as desired.

In the base is formed, partly in the main portion 1 and partly in the removable portion 2, a socket for a member 3, the lower part of which is formed as part of a sphere whereby it may be given a partial rotary movement in its socket in any direction. A portion of the sphere-shaped member extends through the upper surface of the removable part 2, and on this extending portion is formed a boss 4, which is provided with a threaded socket for receiving the supporting stem of a vise or other work supporting tool.

Ordinarily the sphere-shaped member will be free to move in its socket, but in order that it may be clamped in position while the work in the work support is operated on, the removable portion 2 of the base is secured in position in the following manner. The part 2 will normally be held slightly spaced from the part 1 by the sphere-shaped member. The part 2 will at one end be provided with holes through which may extend screws 5 adapted to be received in threaded holes in the part 1. In the other end of the part 2 is formed a hole to receive a headed pin 6 which extends into a recess 7 formed in the part 1. Preferably the hole is counterbored to receive the head of the pin so that the head will not form an objectionable projection on the surface of the part 2. A hole is formed transversely through the part 1 to receive a pin 8, which pin is provided with a suitable handle 9 whereby the pin may be rotated. The pin 6 is provided with a hole 10 through which the pin 8 passes. The pin 8 is provided with an offset or eccentric portion 11, which, when the pin is rotated, actuates the pin 6 to move the part 2 into frictional engagement with the sphere-shaped member 3.

For the purpose of rocking the sphere-shaped member in its socket I provide the following mechanism. Mounted on the side of the part 1 of the base so as to be slidable longitudinally thereof is the member 12. This slidable member 12 is provided with a hole in which is slidable a rod 13 which extends into a recess in the part 1 of the base below the socket for the member 3. This rod is provided adjacent its inner end with a pin 14 which carries a ball 15, which ball is received in a hole or socket 16 formed in the member 3.

To rock the member 3 in a direction transversely of the support the rod 13 is moved backwards or forwards through the opening in the slidable member 12, and for this purpose I provide the following mechanism. Pivotally mounted on the side of the part 1 is a lever 17. One end of this lever is connected by means of a pin and slot connection 18 with a head or plate 19 on the rod 13. For the purpose of steadying this plate a pin 20 is provided on the slidable member 12 which extends through a hole in the plate 19.

The other end of this lever 17 is pivotally connected with one end of a link 21, the other end of which link is pivotally connected with an operating lever 22 pivoted on the base 1. This operating lever also acts as an indicator to co-operate with a scale provided on a quadrant 23. The lever 22 is provided with a screw 24 adapted to engage the quadrant 23 to clamp the lever in position as adjusted.

To rock the member 3 in a direction longitudinally of the support, the slidable member 12 which carries the rod 13 is moved longitudinally of the base. This slidable member is actuated in the following manner. Secured to and slidable with the member 12 is the plate 25 on which are provided a pair of spaced shoulders 26 between which is received one end of an operating lever 27 pivoted on the base portion 1. The plate 25 is provided with a slot 28 through which the pivot pin of the lever 27 extends so that the sliding of the plate 25 is not interfered with. This operating lever 27 also acts as an indicator to co-operate with a scale provided on a quadrant 29. The lever 27 is provided with a screw 30 adapted to engage the quadrant 29 to clamp the lever in position as adjusted.

The operation of the device is as follows. The handle 9 is first actuated so that the base portion 2 is released from its frictional engagement with the member 3.

Either one or both of the levers 22 and 27 may then be rocked so that through the connections hereinbefore described the member 3 may be rocked to move the work-holding device to the proper position or angle, and the arm 9 will then again be actuated to frictionally engage the part 2 with the member 3. It will be evident, of course, that by suitable combinations of movements of the levers 22 and 27 the socket 24 may be moved to any desired inclination within the limits of the device and that such movement may be very finely regulated.

From the above description it will be seen that I have devised apparatus which will satisfactorily attain the object of my invention.

What I claim is:

1. In a microtome, the combination of a base; a work holder supporting member mounted on said base by means of a ball and socket joint; and a member for rocking said supporting member, said members also being connected by means of a ball and socket joint.

2. In a microtome, the combination of a base; a work holder supporting member mounted on said base by means of a ball and socket joint, said supporting member having a recess therein; a member for rocking said supporting member, said second mentioned member having a ball-shaped portion extending into said recess.

3. In a microtome, the combination of a base having a socket formed therein; a spheroidal member in said socket upon which member the work holder is secured, said member having a recess formed therein and said base having a recess therein below the socket; and means for rocking said member in a direction longitudinally of the base comprising a member slidably supported on the side of the base; a rod carried by said slidable member and extending into the recess in the base; and a spheroidal member on said rod extending into the recess in the first mentioned spheroidal member.

4. In a microtome, the combination of a base having a socket formed therein; a spheroidal member in said socket upon which member the work holder is secured, said member having a recess formed therein and said base having a recess therein below the socket; means for rocking said member in a direction longitudinally of the base comprising a member slidably supported on the side of the base; a rod carried by said slidable member and extending into the recess in the base; and a spheroidal member on said rod extending into the recess in the first mentioned spheroidal member; and a lever pivoted on said base adapted to actuate said slidable member.

5. In a microtome, the combination of a base having a socket formed therein; a spheroidal member in said socket upon which member the work holder is secured, said member having a recess formed therein and said base having a recess therein below the socket; means for rocking said member in a direction longitudinally of the base comprising a member slidably supported on the side of the base; a rod carried by said slidable member and extending into the recess in the base; a spheroidal member on said rod extending into the recess in the first mentioned spheroidal member; a lever pivoted on said base adapted to actuate said slidable member; and a quadrant supported on the base with which said lever is adapted to co-operate.

6. In a microtome, the combination of a base having a socket formed therein; a spheroidal member in said socket upon which member the work holder is secured, said member having a recess formed therein and said base having a recess therein below the socket; means for rocking said member in a direction transversely of the base comprising a rod slidable transversely of and extending into the recess in the base; and a spheroidal member on said rod extending into the recess in the first mentioned spheroidal member.

7. In a microtome, the combination of a base having a socket formed therein; a spheroidal member in said socket upon which member the work holder is secured, said member having a recess formed therein and said base having a recess therein below the socket; means for rocking said member in a direction transversely of the base comprising a rod slidable transversely of and extending into the recess in the base; a spheroidal member on said rod extending into the recess in the first mentioned spheroidal member; and a lever pivoted on said base adapted to actuate said rod.

8. In a microtome, the combination of a base having a socket formed therein; a spheroidal member in said socket upon which member the work holder is secured, said member having a recess formed therein and said base having a recess therein below the socket; means for rocking said member in a direction transversely of the base comprising a rod slidable transversely of and extending into the recess in the base; a spheroidal member on said rod extending into the recess in the first mentioned spheroidal member; a lever pivoted on said base connected at one end with said rod; a link connected with the other end of the lever; and a second lever pivoted on the base to which the other end of said link is connected.

9. In a microtome, the combination of a base having a socket formed therein; a spheroidal member in said socket upon which member the work holder is secured, said member having a recess formed therein and said base having a recess therein below the socket; means for rocking said member in a direction transversely of the base comprising a rod slidable transversely of and extending into the recess in the base; a spheroidal member on said rod extending into the recess in the first mentioned spheroidal member; a lever pivoted on said base connected at one end with said rod; a link connected with the other end of the lever; a second lever pivoted on the base to which the other end of said link is connected; and a quadrant supported on the base with which said lever is adapted to co-operate.

10. In a microtome, the combination of a base having a socket formed therein; a spheroidal member in said socket upon which member the work holder is secured, said member having a recess formed therein and said base having a recess therein below the socket; means for rocking said member comprising a member slidably supported on the side of the base; a rod carried by said slidable member and extending into the recess in the base; a spheroidal member on said rod extending into the recess in the first mentioned spheroidal member; means for moving said slidable member on the base; and means for moving said rod relative to the slidable member.

11. In a microtome, the combination of a base having a socket formed therein; a spheroidal member in said socket upon which member the work holder is secured, said member having a recess formed therein and said base having a recess therein below the socket; means for rocking said member comprising a member slidably supported on the side of the base; a rod carried by said slidable member and extending into the recess in the base; a spheroidal member on said rod extending into the recess in the first mentioned spheroidal member; a lever pivoted on said base adapted to actuate said slidable member; and means for moving said rod relative to the slidable member.

12. In a microtome, the combination of a base having a socket formed therein; a spheroidal member in said socket upon which member the work holder is secured, said member having a recess formed therein and said base having a recess therein below the socket; means for rocking said member comprising a member slidably supported on the side of the base; a rod carried by said slidable member and extending into the recess in the base; a spheroidal member on said rod extending into the recess in the first mentioned spheroidal member; means for moving said slidable member on the base; and a lever pivoted on said base adapted to actuate said rod.

13. In a microtome, the combination of a base having a socket formed therein; a spheroidal member in said socket upon which member the work holder is secured, said member having a recess formed therein and said base having a recess therein below the socket; means for rocking said member comprising a member slidably supported on the side of the base; a rod carried by said slidable member and extending into the recess in the base; a spheroidal member on said rod extending into the recess in the first mentioned spheroidal member; means for moving said slidable member on the base; a lever pivoted on said base connected at one end with said rod; a link connected with the other end of the lever; and a second lever pivoted on the base to which the other end of said link is connected.

14. In a microtome, the combination of a base having a socket formed therein; a spheroidal member in said socket upon which member the work holder is secured, said member having a recess formed therein and said base having a recess therein below the socket; means for rocking said member comprising a member slidably supported on the side of the base; a rod carried by said slidable member and extending into the recess in the base; a spheroidal member on said rod extending into the recess in the first mentioned spheroidal member; a lever pivoted on said base adapted to actuate said slidable member; means for moving said rod relative to the slidable member; and a lever pivoted on said base adapted to actuate said rod.

15. In a microtome, the combination of a base having a socket formed therein; a spheroidal member in said socket upon which member the work holder is secured, said member having a recess formed therein and said base having a recess therein below the socket; means for rocking said member comprising a member slidably supported on the side of the base; a rod carried by said slidable member and extending into the recess in the base; a spheroidal member on said rod extending into the recess in the first mentioned spheroidal member; a lever pivoted on said base adapted to actuate said slidable member; means for moving said rod relative to the slidable member; a lever pivoted on said base connected at one end with said rod, a link connected with the other end of the second-mentioned lever; and a third lever pivoted on the base to which the other end of the said link is connected.

16. In a microtome, the combination of a base having a socket formed therein; a spheroidal member in said socket upon which member the work holder is secured, said member having a recess therein; means for rocking said spheroidal member comprising a member having a ball-shaped portion extending into said recess means for actuating said last mentioned member in one direction; and means for rocking said last mentioned member in a direction at an angle to the first mentioned direction.

Signed at Toronto, Can., this 10th day of July, 1925.

HERBERT W. SPENCE.